United States Patent [19]

Matsumoto et al.

[11] Patent Number: 4,630,728
[45] Date of Patent: Dec. 23, 1986

[54] DISC CARTRIDGE

[75] Inventors: Fujio Matsumoto; Yoshitake Kato, both of Ibaragi, Japan

[73] Assignee: Hitachi Maxwell, Ltd., Osaka, Japan

[21] Appl. No.: 647,524

[22] Filed: Sep. 5, 1984

[30] Foreign Application Priority Data

Sep. 7, 1983 [JP] Japan .......................... 58-139344[U]

[51] Int. Cl.⁴ ............................................ B65D 85/57
[52] U.S. Cl. .................................... 206/313; 206/444; 360/133
[58] Field of Search ....................... 206/307, 309–313, 206/444; 360/97, 99, 133

[56] References Cited

U.S. PATENT DOCUMENTS

| | | | |
|---|---|---|---|
| 3,980,178 | 9/1976 | Schidlowski | 206/313 |
| 4,185,314 | 1/1980 | Hatchett et al. | 206/444 |
| 4,208,117 | 6/1980 | Harvey et al. | 206/444 |
| 4,254,864 | 3/1981 | Mikura | 206/313 |
| 4,445,157 | 4/1984 | Takahashi | 360/99 |

FOREIGN PATENT DOCUMENTS

| | | | |
|---|---|---|---|
| 0085165A | 8/1983 | European Pat. Off. | 206/313 |
| 0097221A | 1/1984 | European Pat. Off. | 206/313 |

OTHER PUBLICATIONS

"Cartridge for Magnetic Disk", F. K. King et al., *IBM Technical Disclosure Bulletin*, vol. 19, No. 7, Dec. 1976, 206/444.

"Self-Pressurized Enclosure for Flexible Magnetic Disks", Boyles, *IBM Technical Disclosure Bulletin*, vol. 19, No. 8, Jan. 1977, 206/444.

"Flexible Magnetic Disk Stabilizer", Beck et al, *IBM Technical Disclosure Bulletin*, vol. 20, No. 6, Nov. 1977, 206/444.

*Primary Examiner*—William Price
*Assistant Examiner*—Jimmy G. Foster
*Attorney, Agent, or Firm*—Birch, Stewart, Kolasch & Birch

[57] ABSTRACT

In a disc cartridge comprising a disc case (1) having drive shaft insertion holes (3) on the central portion of the disc case (1) and head insertion holes (4), a disc (2) is rotatably mounted in the disc case (1) and liners (12) laid on the respective inner surfaces of each of the halves of the disc case (1) so as to slidably contact with both surfaces of the disc (2), there are formed ribs (15) on said inner surfaces of the disc case so as generally to surround the part of the drive shaft insertion holes (3).

7 Claims, 7 Drawing Figures

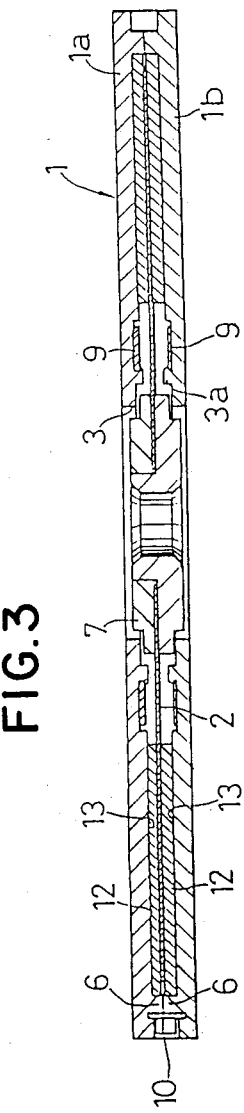
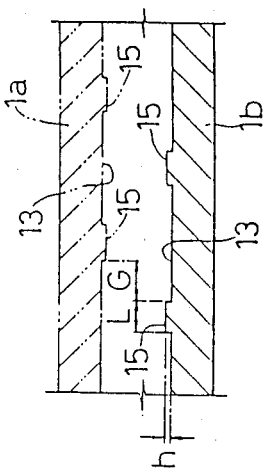
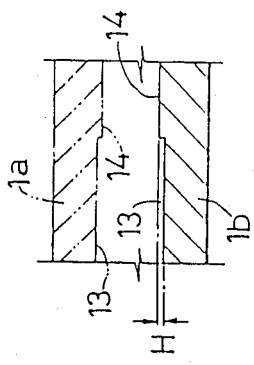

DISC CARTRIDGE

FIELD OF THE INVENTION

The present invention relates to a disc cartridge having a disc sheet rotatably enclosed in a disc case.

BACKGROUND OF THE INVENTION

In a recording disc cartridge of the above type, a floppy disc sheet is rotatably enclosed in a disc case made of a generally hard case with liners made of non woven material interposed between the inner surfaces of the disc case and the floppy disc sheet. In a case where the liners are so laid in the disc case as to slidably uniformly contact with the over all recording face of the disc sheet, there is required a great torque to drive the disc sheet, relative to a low cleaning effect. In order to lower the required rotational torque while still maintaining a good cleaning effect, the liners are provided so that a part of the liners strongly contact the disc sheet. In employing such a configuration it is required to avoid head touch i.e., the state of contact between the magnetic head and the disc sheet is not badly harmed by the deformation of the disc sheet due to the local pressure contact between the liner and the disc sheet. For this purpose, it has been known to provide a protruded portion 14 at the furthest portion rearwardly away from the head insertion hole in the disc case as shown FIG. 2, so as to press the liner to the disc sheet on the protruded portion. Even in this arrangement, during rotation of the disc sheet, the disc sheet may be flapped at an intermediate portion between the protruded portion 14 and the head insertion window 4. Furthermore, since deformation of the disc sheet due to the local pressure contact of the disc sheet onto the liner at the protruded portion remains, good head touch is diminished, whereby there may occur tracking errors and/or distortion of the output signal.

SUMMARY OF THE INVENTION

Accordingly, an essential object of the present invention is to provide a disc cartridge in which the disc sheet can be rotated by decreased torque while still improving the cleaning effect of the disc sheet.

Another object of the present invention is to provide a disc cartridge which enables the prevention of an undesired deformation and/or flapping of the disc sheet at the head insertion windows for assuring good head touch.

According to the present invention, there is provided a disc cartridge which comprises a disc case formed by an upper half and a lower half, the disc case having at least one drive shaft insertion hole on the central portion of the disc case and at least one head insertion hole, a disc rotatably mounted in the disc case and liners laid on the respective inner surfaces of each of the halves of the disc case so as to slidably contact with both surfaces of the disc, wherein the disc case is provided with ribs on the inner surfaces of the disc case so as to generally surround the respective part of the drive shaft insertion hole.

BRIEF EXPLANATION OF THE DRAWINGS

FIG. 3 is a cross sectional view taken along lines III—III in FIG. 1, FIG. 6 is a cross sectional view taken along lines VI—VI in FIG. 4, and FIG. 7 is a cross sectional view taken along lines VII—VII.

DETAILED DESCRIPTION OF THE PREFERRED EMBODIMENT

Figure 1:
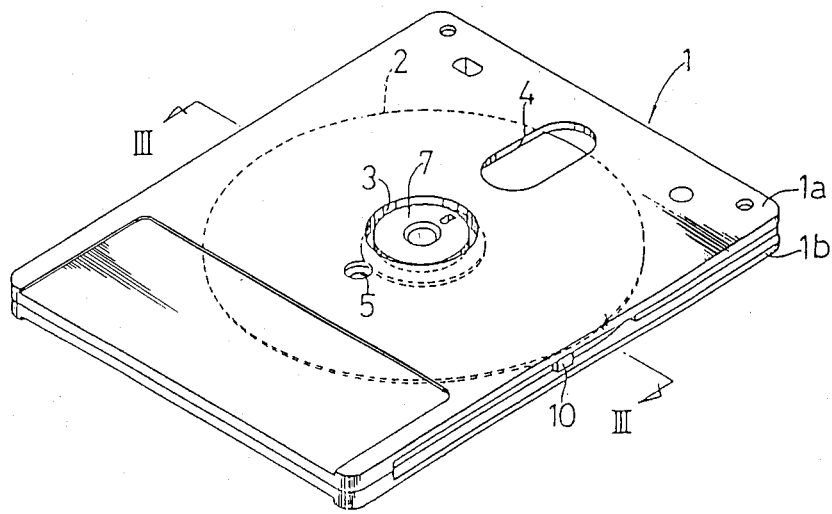
FIG. 1 is a perspective view of a recording disc cartridge according to the present invention.

Referring to FIG. 1, a disc case 1 is formed by an upper half 1a and a lower half 1b each made of plastic resin materials. A recording disc sheet 2 made of a floppy disc is rotatably mounted in the disc case 1.

The disc case 1 is provided with drive shaft insertion holes 3 at the central portion of the disc case 1, head insertion holes 4 at a position towards the front away from the drive shaft insertion holes 3, and index holes 5 near the drive shaft insertion holes 3. All of the holes are through holes. These holes may be defined on any one of the sides of the disc case 1 depending on the type of the disc drive apparatus. The head insertion holes 4 may be so formed as to communicate with the drive shaft insertion holes 3 for expanding the space for writing information in the disc sheet by the recording heads.

Figure 2:
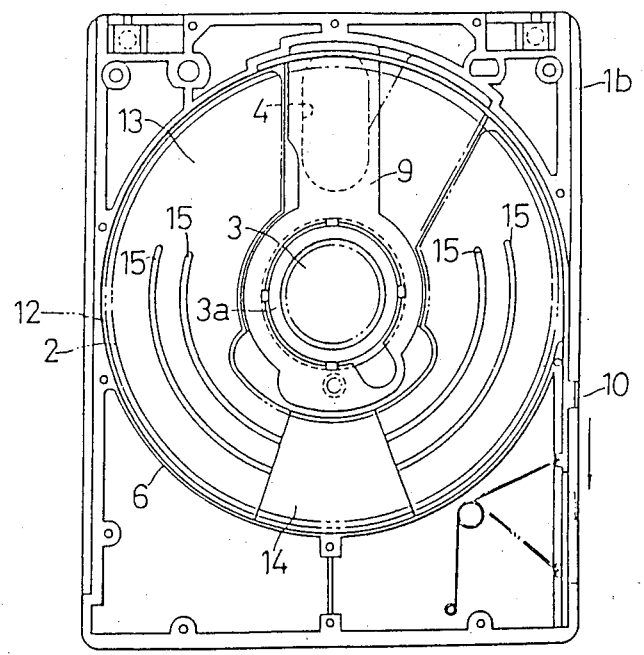
FIG. 2 is a plan view showing the interior of the disc case shown in FIG. 1.

Referring to FIGS. 2 and 3, there are formed a plurality of arcuated walls or ribs 6 on the inner surfaces of both halves 1a and 1b coaxial with the drive shaft insertion holes 3, so that when both halves 1a and 1b are assembled together, the lower faces of the respective walls 6 on the upper half 1a are opposed to the upper faces of the respective ribs on the lower half 1b. The disc sheet 2 may be a magnetic recording disc sheet made of plastic resin material coated with magnetic recording layers. The disc sheet 2 is provided with a hub assembly 7 opposing the drive shaft insertion holes 3 and is accommodated in the chamber surrounded by the arcuated walls 6. The disc sheet 2 may be an optical recording disc sheet.

Shutter members 9 are arranged in the disc case 1 for rotation around the center of the boss 3a of the drive shaft insertion hole 3 so that when the disc cartridge is not used the head insertion holes 4 and the index holes 5 are closed by the shutter members 9, and when the disc cartridge is mounted on the disc drive apparatus, the shutter members 9 can be rotated by a slide rotation member 10 so as to open the head insertion holes 4 and the index holes 5.

Arcuated liners 12, each having a C character configuration are disposed in the spaces surrounded by the arcuated walls 6 except for the drive shaft insertion holes 3 and the head insertion holes 4 on the upper half 1a and the lower half 1b. Each of the liners 12 is made of a non woven sheet material and is securely fitted onto the inner surface of the disc case 1 by adhering over all of the area or part of area of the liner 12 on the disc case 1 by the spot welding method. A preferred way of securing the liner 12 to the disc case 1 is to adhere only the peripheral edge portion of the liner 12 to the disc case 1.

Figure 4:
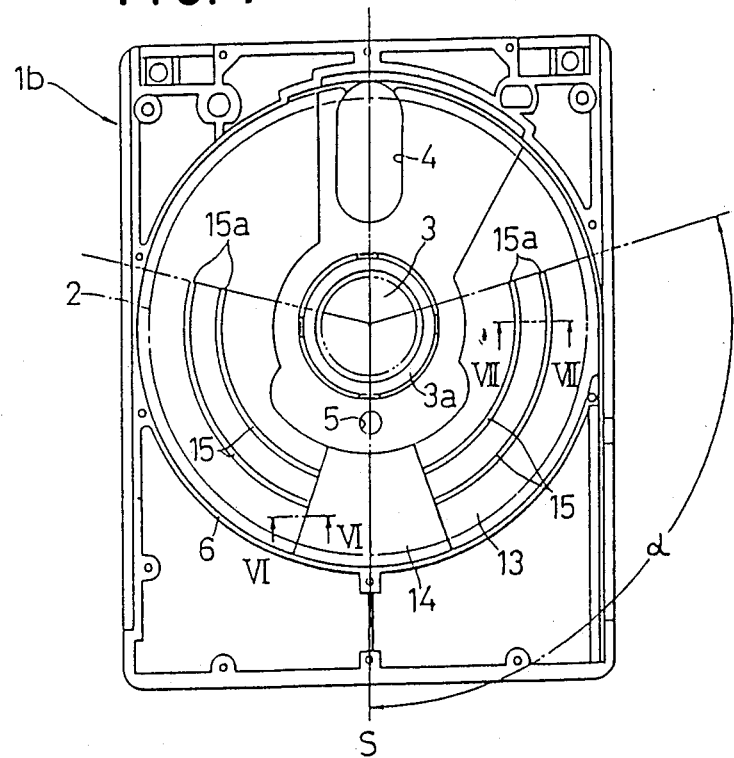
FIG. 4 is a plan view showing an interior of the upper half of the disc case.
Figure 5:
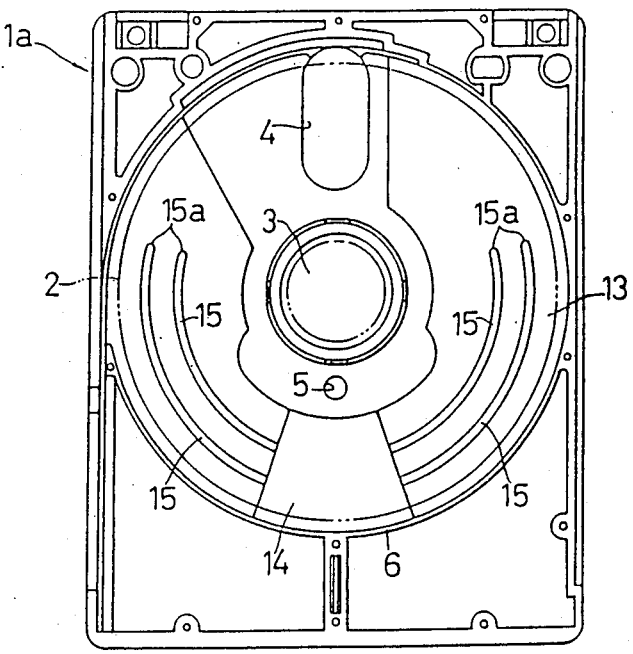
FIG. 5 is a plan view showing the interior of a lower half of the disc case.

Referring to FIGS. 4 and 5, a protruded part 14 with the top face made flat is formed at the central portion and behind the drive shaft insertion hole 3 i.e., at the opposite position of the head insertion hole 4 with respect to the drive shaft insertion hole 3 on the inner surface of each half 1a and 1b, so that when both halves 1a and 1b are assembled together, the respective flat faces of the protruded parts 14 face each other. The protruded parts 14 on the respective halves 1a and 1b may be staggered in such a manner that only a portion of the protruded part of one of the halves is opposed to the protruded part of the other half.

A plurality of ribs 15 are formed on the liner laying area 13 of both halves 1a and 1b so as to extend arcuately conforming to the parts of the circle of the drive shaft insertion holes 5 with the one end of each of the ribs 15 started from the side edge of the protruded part 14. In the embodiment shown the ribs 15 of the upper half 1a are radially staggered with respect to the ribs 15 of the lower half 1b.

Referring to FIGS. 6 and 7, the height h of the ribs 15 is equal to or slightly lower than the height H of the protruded parts 14. In the example, the height h of the rib 15 is 0.18 mm, the height H of the protruded part 14 is 0.27 mm, the width L of the rib is 1.0 mm and the space G in the radial direction between the ribs 15 of the upper half 1a and the lower half 1b is 1.3 mm.

It is desired that the angle $\alpha$ defined by the end 15a of the rib 15 and the line extending in a longitudinal direction passing the center S is larger than 90°. In the preferred embodiment, the angle $\alpha$ is 105° with the end 15a elongated up to the front half portion. The end 15a may be elongated up to near the head insertion hole 4.

By fitting the liners 12 made of non woven sheets on the liner laying area 13 of the upper half 1a and the lower half 1b, over the protruded parts 14, the height of the liner 12 becomes high, so that the disc 2 is pressed by the protruded parts and the disc 2 can be cleaned off by the liners 12.

When the disc cartridge according to the present invention is mounted and driven on the disc drive apparatus, a disc sheet 2 is deformed by the protruded parts 14 during rotation of the disc. However, since the disc 2 rotates while being pressed by the ribs 15 of the upper half 1a and the lower half 1b, the deformation of the disc sheet 2 once occurring by passing the protruded parts 14 can be corrected preventing the flapping of the disc sheet 2.

The number of the ribs 15 may be selected as desired, for example, only one rib may be formed on each left half portion and right half portion of each of the upper half 1a and lower half 1b. The ribs may be asymmetrical. Each of the ribs 15 may be divided into a number of blocks. It is not essential to form the ribs 15 coaxial to the center of the drive shaft insertion hole 3. From the point of decreasing the necessary torque to rotate the disc sheet, it is desired to form the ribs of the upper half 1a and the ribs of the lower half 1b in alternative positions. However, the ribs 15 of the upper half and the lower half may be formed in an opposed manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc cartridge comprising:
   a disc case having an upper half and a lower half;
   said disc case including at least one drive shaft insertion hole on a central portion thereof and at least one magnetic head insertion hole, each half having an inner and outer surface;
   a disc rotatably mounted therein;
   ribs, arcuately shaped and provided on said inner surface of each half of said disc case and located to generally surround approximately half or greater of the perimeter of said drive shaft insertion hole, and
   liners, laid on respective inner surfaces of each of the halves of said disc case, and being positioned between said ribs and said disc, for slidably contacting both surfaces of said disc.

2. The disc cartridge according to claim 1, wherein said disc case is provided with a protruded part at a furthest position from said head insertion hole and the ribs are adapted to extend from said protruded part.

3. The disc cartridge according to claim 1, wherein said ribs are formed generally coaxial with said drive shaft insertion hole.

4. The disc cartridge according to claim 3, wherein at least one rib at one of the halves is situated on a position between two adjacent ribs on the other half when said upper and lower halves are assembled together.

5. The recording disc cartridge according to claim 1, wherein said ribs are formed on a left half portion and a right half portion of each of the halves of said disc case and the angle between a line connecting an end of one of the ribs near to the head insertion hole and the center of the drive shaft insertion hole and a longitudinal center line of the disc area is larger than 90°.

6. The disc cartridge according to claim 2, wherein the height of the ribs is lower than the height of the protruded part.

7. The disc cartridge according to claim 1, wherein the liners are secured onto the inner surfaces of the disc case by bonding at least the inner peripheral edge and the outer peripheral edge thereof.

* * * * *